United States Patent [19]

Hoffmann

[11] Patent Number: 4,843,616
[45] Date of Patent: Jun. 27, 1989

[54] METHOD OF OBTAINING A PHASE DIFFERENCE SIGNAL

[75] Inventor: Michael Hoffmann, Backnang, Fed. Rep. of Germany

[73] Assignee: Ant Nachrichtentechnik GmbH, Backnang, Fed. Rep. of Germany

[21] Appl. No.: 165,715

[22] Filed: Mar. 8, 1988

[30] Foreign Application Priority Data

Mar. 10, 1987 [EP] European Pat. Off. ........ 87103453.4

[51] Int. Cl.[4] .............................................. H03D 3/24
[52] U.S. Cl. ...................................... 375/81; 375/97; 329/124
[58] Field of Search ........................ 375/77, 81, 83, 85, 375/97, 120; 455/208, 258, 265; 329/50, 112, 122, 124

[56] References Cited

U.S. PATENT DOCUMENTS

| | | | |
|---|---|---|---|
| 4,079,329 | 3/1978 | England et al. | 329/50 |
| 4,084,137 | 4/1978 | Welti | 375/39 |
| 4,404,532 | 9/1983 | Welti | 332/17 |
| 4,509,017 | 4/1985 | Andren et al. | 329/105 |
| 4,513,429 | 4/1985 | Roeder | 375/120 |
| 4,538,111 | 8/1985 | Guisto | 329/122 |
| 4,546,322 | 10/1985 | Crutcher | 329/124 |
| 4,592,075 | 5/1986 | Tsukamoto | 375/81 |
| 4,642,573 | 2/1987 | Noda et al. | 329/124 |
| 4,687,999 | 8/1987 | Desperben et al. | 329/109 |
| 4,713,630 | 12/1987 | Matthews | 375/81 |

FOREIGN PATENT DOCUMENTS

0071514 2/1983 European Pat. Off. .
0079576 5/1983 European Pat. Off. .
0154503 9/1985 European Pat. Off. .

OTHER PUBLICATIONS

A. Leclert et al., "Universal Carrier Recovery Loop for QASK and PSK Signal Sets", IEEE Transactions on Communications, vol. Com-31, No. 1, Jan. 1983, pp. 130-136.

Tho Le-Ngoc et al., "A Digital Approach to Symbol Timing Recovery Systems", IEEE Transactions on Communications, vol. Com-28, No. 12, Dec. 1980, pp. 1993-1999.

Analog Devices Corporation Data Sheet and Application Notes, "Universal Trigonometric Function Generator AD639", pp. 1-12.

Analog Devices Corporation Data Sheet and Application Notes, "High Precision Wide-Band RMS-DC Converter AD637", pp. 1-8.

Analog Devices Corporation Data Sheet and Application Notes, "Balanced Modulator/Demodulator AD630", pp. 1-8.

Patent Abstracts of Japan, vol. 10, No. 175 (E-413) [2231], Jun. 20, 1986.

B. F. Logan, Jr., "Bandwidth-Error Exchange for a Simple Fading Channel Model", AT&T Technical Journal, vol. 64, No. 7, Sep. 1985, pp. 1687-1704.

G. J. Foschini et al., "On the Selection of a Two-Dimensional Signal Constellation in the Presence of Phase Jitter and Gaussian Noise", The Bell System Technical Journal, vol. 2, No. 6, Jul.-Aug. 1973, pp. 927-965.

Carrier Recovery for M-QAM-Signals, in ECRR, pp. 247-253, published by Vde-Verlag, Munich, Nov. 1986.

Primary Examiner—Robert L. Griffin
Assistant Examiner—Stephen Chin
Attorney, Agent, or Firm—Spencer & Frank

[57] ABSTRACT

A method of obtaining a signal representing the phase difference between a local carrier signal and the carrier of an amplitude and/or phase shift keyed received signal wherein: the received signal is divided into two cartesian coordinate signal components which are a function of the phase difference and are in a quadrature relationship to one another; each pair of cartesian coordinate signal components, each representing one of a plurality of permitted signal states, is converted into two corresponding polar coordinate signal components, a decision is then made as to which is the permitted, unfalsified polar signal components which the polar signal components of the received signal most closely approach; and the phase difference is derived from a comparison between the decided-upon polar signal components and the received polar signal components.

11 Claims, 9 Drawing Sheets

METHOD OF OBTAINING A PHASE DIFFERENCE SIGNAL

BACKGROUND OF THE INVENTION

The present invention relates to a method of obtaining a signal which represents the phase difference between a local carrier or oscillator signal and the carrier of an amplitude and/or phase shift keyed received signal having a plurality of possible signal states. More particularly, the present invention relates to a method of the above type wherein signal representing the received signal is initially divided into a pair of cartesian coordinate signal components (x, y) which are a function of the phase difference and are in quadrature relationship to one another, with the two signal components together representing one of the possible signal states, and wherein the pair of cartesian coordinate signal components (x, y) is thereafter converted into a corresponding pair of polar coordinate signal components (R, α), with one of the polar signal components representing the amplitude (R) of a signal state vector formed by the pair of cartesian coordinate signal components (x, y) while the other polar signal component represents the phase angle (α) for this signal state vector.

Such a method for obtaining a control signal for a voltage controlled oscillator employed for carrier recovery in a demodulator circuit for amplitude and/or phase shift keyed (QASK) signals, is disclosed generally in an article by M. Hoffmann, entitled "Carrier Recovery for m-QAM Signals", in ECRR, pages 247–253, published by vde-Verlag, Munich, November 1986, and more specifically in Applicant's copending U.S. patent application Ser. No. 07/062,366 filed June 12, 1987, the subject matter of which is incorporated herein by reference.

SUMMARY OF THE INVENTION

It is an object of the invention to provide a method of the above-mentioned type with which a signal can be obtained that gives unequivocal information, even with amplitude interference or incorrect amplitude setting of a received QASK signal, when the phase difference between a local carrier signal and the QASK signal carrier is precisely 0° or an equivalent phase thereto (e.g., for m-QAM, 0°+n·90°, where n is an integer number).

The above object is generally achieved according to the present invention by a method of obtaining a signal representing the phase angle difference between a local oscillator signal and the carrier of an amplitude and/or phase shift keyed received signal having a plurality of possible signal states, which method comprises the steps of:

(a) dividing the received signal into a pair of cartesian coordinate signal components which are a function of the phase angle difference and which are in quadrature relationship to one another, with the two signal components together representing one of the possible signal states;

(b) converting the pair of cartesian coordinate signal components into a corresponding pair of polar coordinate signal components, with a first of the pair of polar signal components representing the amplitude (R) of a signal state vector formed by the pair of cartesian coordinate signal components, and with the second of the pair of polar signal components representing the phase angle (α) for this signal state vector;

(c) forming an upper limit value ($R_{max}$) by adding a value ($d_2$) to the first polar signal component representing the amplitude (R), and forming a lower limit value ($R_{min}$) by subtracting a value ($d_1$) from the first polar signal component representing the amplitude (R);

(d) providing a first quantizer which contains a set or supply of predetermined amplitude values derived from all possible, true signal states which might have been transmitted, with these predetermined amplitude values being staggered such that a predetermined value of the set is disposed below and above each possibly occurring amplitude value;

(e) feeding the upper limit value ($R_{max}$) and the lower limit value ($R_{min}$) to the first quantizer and utilizing the first quantizer to determine all those amplitude values from the set of predetermined amplitude values which lie between the highest predetermined amplitude value below or at the lower limit value ($R_{min}$), and the lowest predetermined amplitude value above or at the upper limit value ($R_{max}$);

(f) providing a second quantizer which contains a set or supply of predetermined phase angle values derived from all possible, true signal states that might have been transmitted;

(g) feeding the second polar signal component corresponding to the phase angle (α) of the received signal to the second quantizer and utilizing the second quantizer to determine which phase angle value, selected from the set of predetermined phase angle values contained therein and belonging to all signal state vectors having the amplitude values determined in step (e), comes closest to the phase angle represented by the second polar signal component derived from the input signal; and (h) determining the difference between the phase angle value determined in step (g) and the phase angle represented by the second polar signal component derived from the input signal, with this difference being proportional to the phase angle difference between the local oscillator signal and the carrier of the keyed received signal.

According to a modification of the method of the invention, instead of directly proceeding through the steps indicated above, the phase angle difference values, or values corresponding or proportional thereto, are predetermined or precalculated for the permitted values of the cartesian coordinate components and stored in respective addresses of an addressable memory. According to this modification, the cartesian coordinate signal components (x, y), which are in a quadrature relationship to one another, are quantized and coded in parallel in respective analog/digital converters, a code word is formed from the two coded signal components which together belong to each quantized signal state, with the code word indicating the address in a memory where the phase angle difference signal determined for the respective quantized signal state of the two signal components, or a signal proportional thereto, is stored in coded form, and the coded difference signal associated with the address is read out of the memory and fed to a digital/analog converter to provide the desired difference signal.

The method of the invention has the advantage that it can be realized with relatively little circuitry and is very reliable in furnishing the correct phase difference, even if used with extremely high-level (e.g. 256 QAM) amplitude and/or phase shift keyed signals.

BRIEF DESCRIPTIONN OF THE DRAWINGS

The invention will now be described in greater detail with reference to embodiments that are illustrated in the drawing figures wherein.

DETAILED DESCRIPTION OF THE PREFERRED EMBODIMENTS

In the communications art, methods for transmitting information by means of amplitude and/or phase shift keyed signals (abbreviatedly called QASK signals) have gained increasing significance in recent years. QASK signals are known to be described as follows:

$$u_1(t) = u_1 \sum_k g(t - kT) \cdot \{a_K \cos(\omega t + \phi) + b_K \sin(\omega t + \phi)\} \quad (1)$$

where $\cos(\omega t + \phi)$ represents the normal or in phase component of the received signal carrier $u_1$, $\sin(\omega t + \phi)$ represents the quadrature component of the signal carrier $u_1$, and $g(t)$ is a function which results from signal shaping and sampling and which meets the following condition for particular values of t to avoid inter-symbol interference.

$$g(t) = \begin{cases} 1 & \text{for } t = 0 \\ 0 & \text{for } t = nT, \text{ with } n \text{ being an integer number } n \neq 0. \end{cases} \quad (2)$$

The value pairs $(a_K, b_K)$ contain the time and value discrete information to be transmitted at times $t = kT$ (where T is the symbol rate). In a given m-level transmission method, the value pairs $(a_K, b_K)$ must take on no more than m different value combinations. m-level quadrature amplitude modulation methods (QAM methods) are here of particular significance.

There exists literature describing other QASK modulation methods, for example combinations of n−PSK/k−ASK (n+k=m) or combinations of n−PSK/k−ASK (n+k>m). The discussion below applies to all QASK methods, but will be described with reference to a QAM method.

Figure 1:
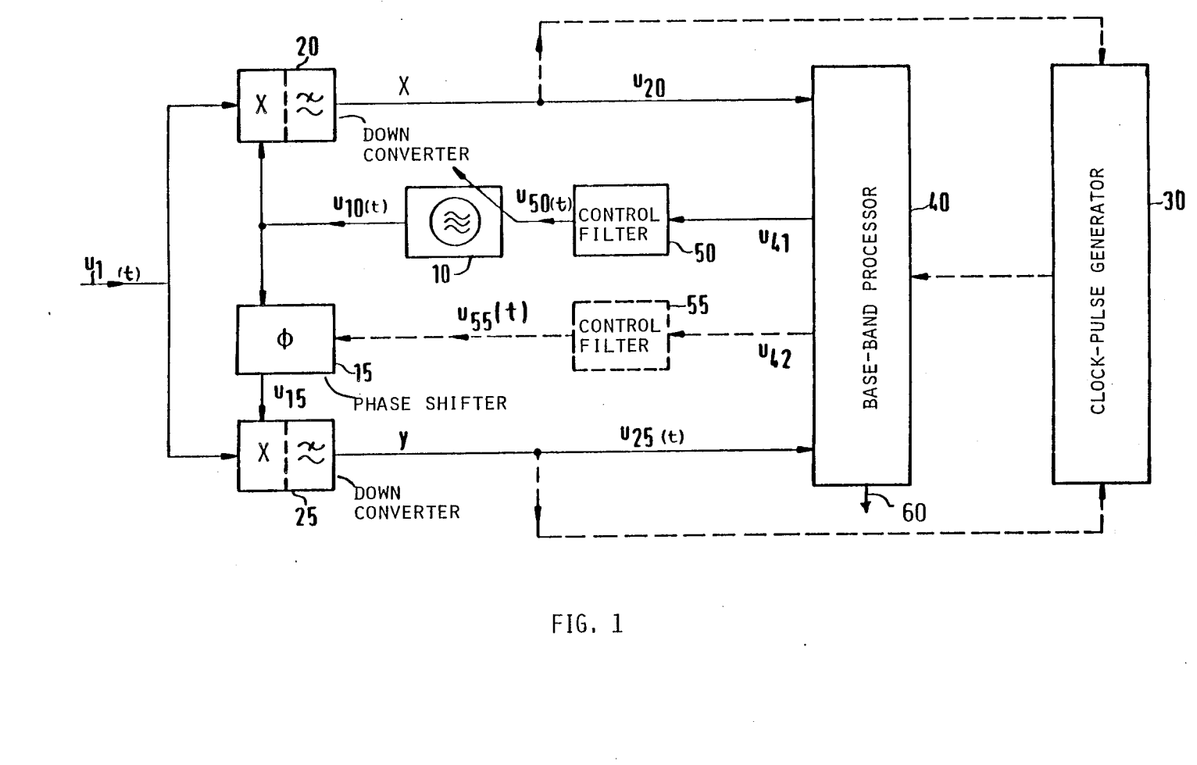
FIG. 1 is a general block circuit diagram of a QASK receiver which can be used for carrying out the method according to the invention.

The block circuit diagram shown in FIG. 1 represents the known circuit principle of a quadrature receiver suitable for the demodulation of QASK signals. In FIG. 1, solid lines are used to illustrate essential circuitry for regenerating the carrier of the received input signal and dotted lines are used to show preferable additional circuitry and connections.

In FIG. 1, a voltage controlled oscillator (VCO) 10 generates an output signal $u_{10}(t)$ which has a fixed phase relationship with the carrier of the input signal $u_1(t)$:

$$u_{10}(t) = \hat{u}_{10} \cdot \cos(\omega t + \phi + \psi) \quad (3)$$

The phase $\psi$ is a function of the control signal $u_{50}(t)$ for the VCO 10 originating from a control filter 50. By means of a phase shifter 15, a signal $u_{15}(t)$, which is shifted in phase by 90° from signal $u_{10}(t)$, is formed from the signal $u_{10}(t)$, i.e.

$$u_{15}(t) = \hat{u}_{10} \cdot \sin(\omega t + \phi + \psi) \quad (4)$$

Down converters 20 and 25 generate from input signal $u_1(t)$ and from signals $u_{10}(t)$ and $u_{15}(t)$, respectively, the respective signals $$u_{20}(t) = A \cdot \Sigma_K g(t - kT) \cdot \{a_K \cos\psi - b_K \sin\psi\} \quad (5)$$

and $$u_{25}(t) = A \cdot \Sigma_K g(t - kT) \cdot \{a_K \sin\psi - b_K \cos\psi\} \quad (6)$$

The information regarding the clock pulse frequency 1/T and its phase position contained in $u_{20}(t)$ and $u_{25}(t)$ can be utilized in a clock pulse recovery or regenerator circuit 30 to regenerate a clock pulse signal in the correct phase position. One embodiment of such a clock pulse regenerator is disclosed, for example, in an article by Le-Ngoc et al, entitled "A Digitial Approach to Symbol Timing Recovery Systems" in IEEE Trans. Com., Volume COM-28, No. 12, December 1980, pages 1993–1999.

The regenerated clock pulse signal is employed to sample the signals $u_{20}(t)$ and $u_{25}(t)$ as times $t = kT$. This is performed, in addition to others, in a baseband processor 40. The following applies for the two baseband signal components which are in a quadrature relationship to one another:

$$x = u_{20}(kT) = A \cdot (a_K \cos\psi - b_K \sin\psi) \quad (7)$$

$$y = u_{25}(kT) = A \cdot (a_K \sin\psi + b_K \cos\psi) \quad (8)$$

For $\psi = 0$, the two signal components x and y represent the demodulated information $a_K$, $b_K$. A significant task of the demodulator circuit is thus to change the phase $\psi$ to 0. Since at $\psi = 0$ the locally generated signal $u_{10}(t)$ is identical, except for an amplitude factor, with the one carrier component of the input signal $u_1(t)$, signal $u_{10}(t)$ is the locally regenerated carrier signal.

The output signal $u_{41}(t)$ of baseband processor 40 (to be described in detail below), is a function of the phase difference between the carrier of the received input signal $u_1(t)$ and the local carrier signal $u_{10}(t)$ generated by the voltage controlled oscillator 10. In the circuit of FIG. 1, the signal $u_{41}(t)$ is filtered in a control filter 50, which provides an output signal $u_{50}(t)$ which is applied as the control signal for the voltage controlled oscillator (VCO) 10.

Down converters 20 and 25, baseband processor 40, control filter 50, VCO 10 and phase shifter 15 of FIG. 1 form a control loop for the local regeneration of the carrier of input signal $u_1(t)$. At the same time, blocks 20, 25, 10 and 15 constitute the quadrature receiver.

For correct demodulation, (the demodulated output being illustrated at 60 in FIG. 1) it is important that the locally regenerated carrier components $u_{10}(t)$ and $u_{15}(t)$ are shifted in phase by 90° with respect to each another. However, in practice, small deviations from the 90° phase difference may exist. Then, instead of Equations (3) and (4), the following applies:

$$u_{10}(t) = \hat{u}_{10} \cos(\omega t + \phi + \psi) \tag{9}$$

$$u_{15}(t) = \hat{u}_{10} \sin(\omega t + \phi + \psi + \delta) \tag{10}$$

This changes Equations (7) and (8) to $$x = A \cdot \{a_K \cos\psi - b_K \sin\psi\} \tag{11}$$

$$y = A \cdot \{a_K \sin(\psi + \delta) + b_K \cos(\psi + \delta)\} \tag{12}$$

From these equations it follows at once that for optimum demodulation it must be attempted to obtain $\psi = \delta = 0°$. In addition to the carrier regeneration loop which minimizes the phase difference $\psi$, a second control loop is thus also available to minimize $\delta$.

For this purpose, phase shifter 15 in the circuit of FIG. 1 may be constructed to make fine turning of the phase shift possible by way of a control signal. The additional control information $u_{42}(t)$ required for this purpose can also be obtained from baseband processor 40. In the block circuit diagram of FIG. 1, the control signal $u_{42}(t)$, which is a function of the phase difference $\delta$ between the carrier signal components $u_{10}(t)$ and $u_{15}(t)$ and which is determined in a manner similar to that used for signal $u_{41}(t)$, is fed to a control filter 55 whose output signal $u_{55}(t)$ is fed to the control input of phas shifter 15.

Down converters 20 and 25, baseband processor 40, control filter 55, local local oscillator 10 and phase shifter 15 constitute the control circuit for bringing the phase difference $\delta$ to the value of 0°.

With the foregoing in mind by way of background, the method according to the invention, which is preferably performed by the baseband processor 40 and involves an improved manner of generating signal $u_{41}$ for controlling VCO 10, will now be described below. In general, the invention provides a method for forming a signal which is dependent on the phase difference between the local carrier signal and the carrier of the received signal and which unequivocally becomes zero only if the phase difference is in fact 0° or a phase equivalent thereto.

The quadrature receiver of FIG. 1 forms the normal or in-phase component x and the quadrature component y of the complex waveform envelope of the received signal $u_1(t)$. Thus, the quadrature receiver generates two othogonally oriented cartesian coordinate signal components x and y.

In a first method step according to the invention, the cartesian coordinate signal components x and y are now transformed into two polar coordinate signal components:

$$R = \sqrt{x^2 + y^2} \tag{13}$$

$$\alpha = \begin{cases} \arctan(y/x), & \text{if } x \geq 0 \\ \arctan(y/x) + \pi, & \text{if } x < 0, \end{cases} \tag{14}$$

wherein the polar signal component R represents the amplitude of a signal state vector formed by the two cartesian coordinate signal components x and y, and the other polar signal component $\alpha$ represents the phase angle of this signal state vector. Using Equations (7) and (8), with the term A in these equations being set to 1, the following applies for polar signal components R and $\alpha$:

$$R = \sqrt{a_K^2 + b_K^2} \tag{15}$$

$$\alpha = \begin{cases} \psi + \arctan(b_K/a_K), & \text{if } x \geq 0 \\ \psi + \arctan(b_K/a_K) + \pi, & \text{if } x < 0 \end{cases} \tag{16}$$

With the aid of a (multi-level) decision circuit or quantizer, it is possible to determine the correct amplitude of the transmitted signal state $(a_K, b_K)$ from component R, the amplitude of a received signal state, even if its signal components x and y are slightly falsified by noise or by displacement of the sampling instant with respect to kT.

The procedure for determining the quantizer output signal values, which is of fundamental importance for rating or dimensioning the quantizer, is as follows. For all permitted or permissible transmitting signal states $(a_K, b_K)$, the amplitude values $R = \sqrt{a_K^2 + b_K^2}$ are determined and arranged according to magnitude. Thus, one obtains a value supply or store "R" having r different values $R_i$, the "nominal amplitudes", where $$0 \leq R_1 < \ldots < R_i < \ldots < R_r.$$

The quantizer for the amplitude must then be able to produce precisely these r output values. The decision thresholds $\tilde{R}_i$ are defined as follows:

$$0 = \tilde{R}_0 \leq R_1 < \tilde{R}_1 < R_2 < \tilde{R}_2 < \ldots < \tilde{R}_{r-1} < R_r < \tilde{R}_r$$

A recommendable threshold position is determined in that the probabilities of finding R in the interval ($R_i$, $R_{i+1}$), if all possible signal states having amplitude value $R_i$ were transmitted, are set to be the same for all i. Another, simpler way of defining the threshold is given, for example, by $$\tilde{R}_i = (R_i + R_{i+1})/2 \text{ for } i = 1, \ldots, r-1.$$

To be able to derive the actually transmitted signal state from a received signal state, the thresholds between which the amplitude R of the received signal state lies must initially be determined. This amplitude R is then decided upon from that amplitude value within the available value supply "R" which lies within the determined thresholds.

Once it has been decided with which amplitude value from the value supply "R" the received amplitude is to be associated, a determination must also be made as to the phase angle from an existing supply of values with which the phase angle of the received signal state is to be associated. This decision process is also performed with the aid of a quantizer.

For a determination of the signal output values of the phase angle quantizer, the procedure must be as follows:

For all permissible transmitting signal states $(a_K, b_K)$ having the amplitude value $R_i$, the phase angle are determined and arranged according to magnitude. Thus, one obtains qi different phase angle values for each amplitude value $R_i$ where $$-\pi/2 \leq \alpha_{i,1} < \ldots < \alpha_{i,j} < \ldots < \alpha_{i,qi}$$

The supply of phase angle values belonging to each normal or nominal amplitude value $R_i$ will hereinafter be called "$\alpha_1$".

The phase angle quantizer must then be able to produce precisely these $q_i$ output values. The decision thresholds $\tilde{\alpha}_{i,j}$ are fixed as follows:

$$\tilde{\alpha}_{i,0} < \alpha_{i,1} < \tilde{\alpha}_{i,2} \ldots < \tilde{\alpha}_{i,qi-1} < \alpha_{i,qi} < \tilde{\alpha}_{i,0} + 2\pi = \tilde{\alpha}_{i,qi}$$

A recommendable position for thresholds $\tilde{\alpha}_{i,j}$ is calculated in that the probabilities of finding $\alpha$ in the interval $(\alpha_{ij}\alpha_{i,j-1})$ if the signal state was transmitted with $R = R_i$ and $\alpha = \alpha_{ij}$, with i being fixed, is set to be equal for all j. Another possibility of defining the thresholds is given, for example, by $$\tilde{\alpha}_{i,j} = (\alpha_{ij} + \alpha_{k,j+1})/2 \text{ for } j=1, \ldots, 9_{i-1};$$

$$\tilde{\alpha}_{i,qi} = (\alpha_{i,qi} + \alpha_{i,1} + 2\pi)/2$$

Figure 2:
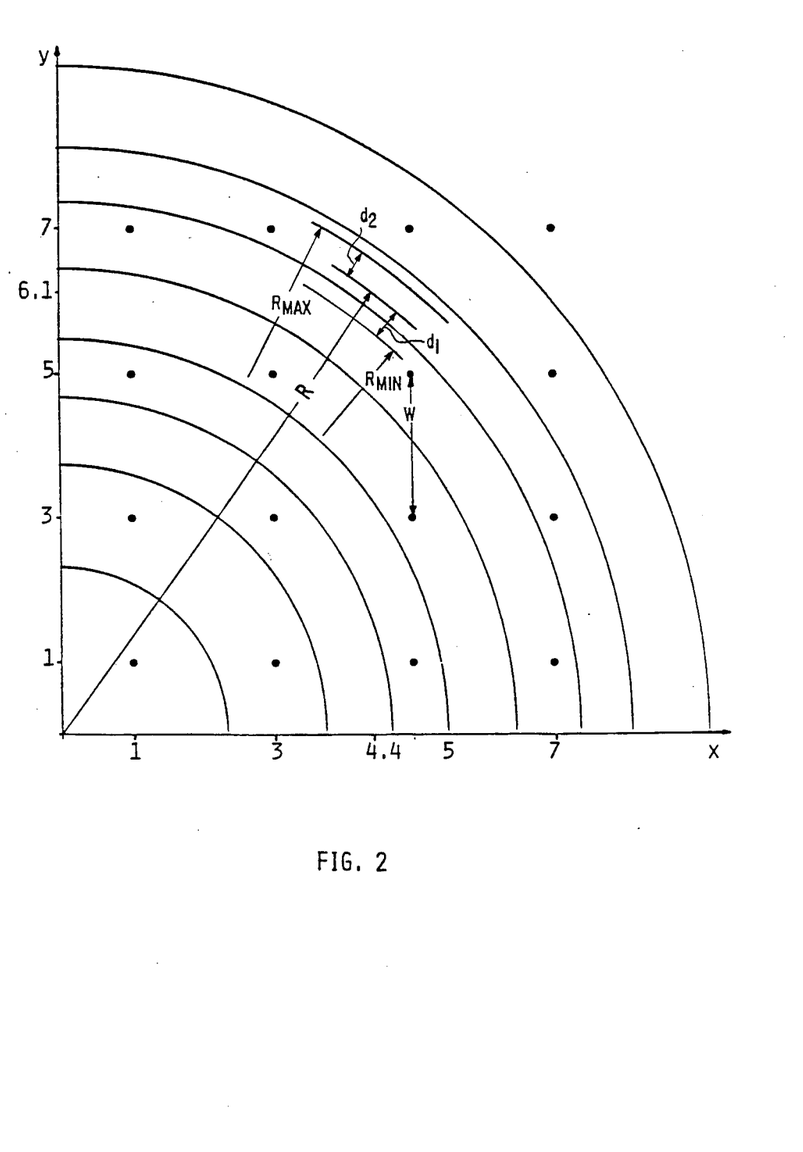
FIG. 2 is a signal state diagram of a 64-QAM system used in explaining the invention.

The above described amplitude and phase angle decision will now be clarified with reference to FIG. 2 which is a signal state diagram for a 64-QAM system shown only in the first quadrant.

In a 64-QAM system, the values $a_k$ and $b_k$ are elements of the set $\{-7, -5, -3, -1, 1, 3, 5, 7\}$.

The nominal amplitude values are determined as $R_{nominal} = \sqrt{a_k^2 + b_k^2}$. It thus will be found, that the values of all nominal amplitudes $R_i$ are elements of the set "R"=$\{\sqrt{2}, \sqrt{10}, \sqrt{18}, \sqrt{26}, \sqrt{34}, \sqrt{50}, \sqrt{58}, \sqrt{74}, \sqrt{98}\}$. This is the above defined value store "R" of the nominal amplitudes. Replacing the square roots by decimal values, it is found that "R"=$\{1.414, 3.162, 4.243, 5.099, 5.831, 7.071, 7.616, 8.602, 9.899\}$. It will be apparent that these nine values can be arranged by magnitude in a sequence.

Decision thresholds $\tilde{R}_i$ can be selected between elements of this sequence. If one forms the amplitude thresholds for the amplitude quantizers as arithmetic means of adjacent nominal amplitudes, the following sequence of amplitude thresholds $R_i$ is generated: $\tilde{R}_1 = 2.288$, $\tilde{R}_2 = 3.702$, $\tilde{R}_3 = 4.671$, $\tilde{R}_4 = 5.465$, $\tilde{R}_5 = 6.451$, $\tilde{R}_6 = 7.343$, $\tilde{R}_7 = 8.109$, $\tilde{R}_8 = 9.251$.

For all permissible transmitting signal states $(a_k, b_k)$ having the amplitude value $R_i$, the phase angles are determined and arranged according to magnitude. For example, the four signal states $(1, -1), (1,1), (-1,1)$ and $(-1, -1)$ lead to the nominal amplitude $R_1 = 1.414$. The phase angles belonging to these states are $\alpha_{1,1} = -45°$, $\alpha_{1,2} = -45°$, $\alpha_{1,1} = +45°$, $\alpha_{1,3} = 135°$ and $\alpha_{1,4} = 225°$. The number $q_1$ of different phase angle values belonging to the nominal amplitude $R_1$ is thus $q_1 = 4$ and the supply "$\alpha_1$" is $\{-45°, +45°, 135°, 225°\}$. The same procedure may be applied to all other signal states thus yielding the other supplies "$\alpha_2$" to "$\alpha_9$".

Now, as an example, it is assumed that the desired signal state (5,5) is transmitted in a 64-QAM trasmit/receive system and that, due to the not yet effected phase synchronization of the local carrier signal, the pair of cartesian signal components $(x,y) = (3.6, 6.1)$ has been received in the quadrature receiver. This corresponds to a pair of polar signal components $(R, \alpha) = (7.083, 59.45°)$. Since $\tilde{R}_5 = 6.451 < R = 7.083 < \tilde{R}_6 = 7.343$, R will be decided to be $\tilde{R}_6 = 7.071$. The phase angle value supply "$\alpha_6$" contains the angle values $8.13° + n\cdot 90°$, $45.0° + n\cdot 90°$ and $81.87° + n\cdot 90°$ with $n = -1, 0, 1, 2$. If one forms the phase angle thresholds as the arithmetic mean of adjacent phase angles, then $\tilde{\alpha}_{6,4} = 26.57°$ and $\tilde{\alpha}_{6,5} = 63.43°$ are the phase angle thresholds neighboured to the received angle $\alpha = 59.45°$ from which it follows that $\alpha$ will be decided to be $\hat{\alpha}_{6} = \alpha_{6,5} = 45°$. The phase difference between the actual value and the desired value, which serves as the controlling value for the voltage controlled oscillator 10, is then 14.45°. In this specific case, the controlling sign is positive.

A further example will now serve to discuss the case where the amplitude is determined only relatively inaccurately due to inadequacies of the amplitude regulation. As in the first example, it is assumed that the signal state (5, 5) is being transmitted. It is further assumed that amplitude regulation in the receiver is possible only to an accuracy of 7% and the cartesian signal state $(x, y) = (4.4, 6.1)$ is being received. This corresponds to a polar signal state $(R, \alpha) = (7.52, 54.2°)$. In fact, the received amplitude is thus about 6.4% too high. The result is that the amplitude R of the received signal is decided to be $R_7 = 7.616$. This nominal amplitude belongs to the phase angle value supply "$\alpha_7$" = $\{66.8°, 23.2°\}$. Therefore, the phase angle $\alpha$ of the received signal is decided to be $\hat{\alpha}_7 = 66.8$. The pair of polar coordinate components $(R, \alpha) = (7.616, 66.8°)$ corresponds to the pair of cartesian coordinate components $(x, y) = (3, 7)$. With a correctly set amplitude, the value supply for the phase angles used as the basis would be the same as in the preceding example. Then a decision would have been made for $\hat{\alpha}_6 = 45°$, i.e. for the correct angle. The uncertainty in the amplitude thus leads to an incorrect decision in this example.

To avoid such incorrect decisions, the following method, in deviation from the above-described procedure, is employed according to the invention after conversion of the polar coordinates of a received signal state.

As indicated in FIG. 2, an upper limit value $R_{max}$ and a lower limit value $R_{min}$ are formed for the polar amplitude component R derived from the received signal. The lower limit value $R_{min}$ is here obtained by subtracting a value or quantity $d_1$ from the amplitude R, and the upper limit value $R_{max}$ is obtained by adding a value or quantity $d_2$ to the amplitude R. The values $d_1$ and $d_2$ can be selected at such a magnitude that $0 < d_1 < R$ and $D_2 > 0$. The values may be, for example, $d_1 = d_2 = w/4$, where w is the distance between the respective x and y components of two permitted signal states (see FIG. 2).

Then, from the value supply "R" of the nominal amplitudes and by means of a threshold decision or quantization, all those nominal amplitude values are determined which lie between the highest decision threshold below or at the lower limit value $R_{min}$ and the lowest decision threshold above or at the upper limit value $R_{max}$. The thus selected nominal amplitudes can therefore be interpreted to be those nominal amplitudes which come closest to the amplitude of the received signal state under consideration of the amplitude uncertainty. Under the condition that $\tilde{R}_i \leq R_{min} < \tilde{R}_{i+1}$ and $\tilde{R}_{i+m-1} < R_{max} \leq \tilde{R}_{i+m}$, amplitudes $R_{i+1}$ to $R_{i+m}$ are now selected if the following applies:

$$\tilde{R}_i < R_{i+1} < \tilde{R}_{i+1} < \ldots < \tilde{R}_{i+m} < R_{i+m}$$

Then, from the combined quantity "α" of the value supples "$\alpha_{i+1}$" v ... v "$\alpha_{i+m}$" of the phase angles of all signal states having the nominal amplitudes $R_{i+1}$ to $R_{i+m}$, the phase angle α is determined which comes closest to the phase angle α determined from the received signal state.

In a last method step, finally, the difference $$\alpha - \hat{\alpha} = \psi \tag{17}$$

is formed which represents the phase difference ψ associated with the received signal state and serves as the control signal for the voltage controlled oscillator of the quadrature receiver.

The example shown in FIG. 2 and already discussed above will be used once more to explain the effect of the above-described method of the determination of the phase difference ψ.

Pursuant to the example, the signal state (x, y)=(5,-5) is assumed to have been transmitted and the received signal state is assumed to be (x, y)=(4.4, 6.1). The latter cartesian coordinate components then correspond to the polar coordinate signal state (R, α)=(7.52, 54.2°). The values $d_1 = d_2 = 0.4$ furnish a lower limit value $R_{min} = 7.52 - 0.4 = 7.12$ and an upper limit value $R_{max} = 7.52 + 0.4 = 7.92$. If one selects the arithmetic mean of adjacent nominal amplitudes as the amplitude thresholds, then the highest threshold below the lower limit value $R_{min}$ is $\hat{R}_5 = 6.45$ and the lowest threshold below the upper limit value $R_{max}$ is $\hat{R}_7 = 8.11$. Thus, the possible nominal amplitudes $R_6 = 7.07$ and $R_7 = 7.61$ belong to amplitude R=7.52 of the received signal. The value supplies for the associated phase angles are "$\alpha_6$"={81.9°, 45°, 8.1°} and "$\alpha_7$"={66.8°, 23.2°}. Thus the value supply "α"={8.1°, 23.2°, 45°, 66.8°, 81.9°}. The phase angle from value supply "α" closest to α=54.2° is thus $\hat{\alpha}=45°$. The actually transmitted signal state (x, y)=(5, 5) does indeed have an associated phase angle α=45°. Thus, in spite of the amplitude uncertainty, the method according to the invention produces the unfalsified phase difference $\alpha - \hat{\alpha} = 54.2° - 45° = 9.2° = \psi$.

Figure 3:
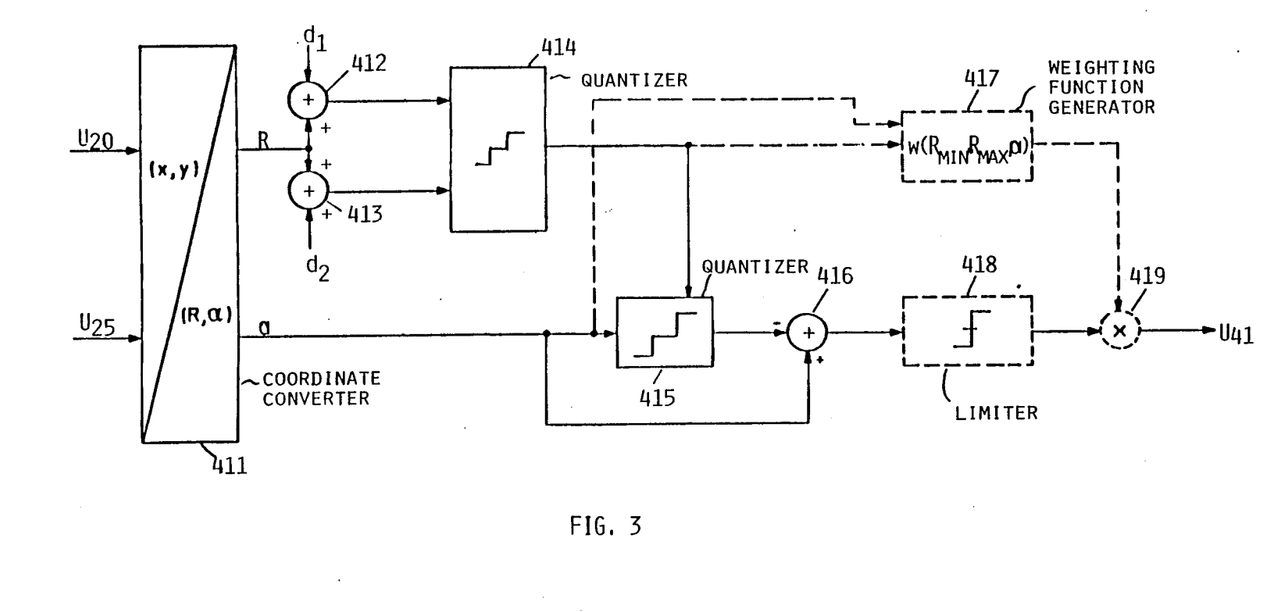
FIG. 3 is a block diagram of a circuit for determining a phase difference signal according to the invention.

FIG. 3 shows a block circuit diagram for the determination of a phase difference signal according to the method of the invention as described above.

Figure 7:
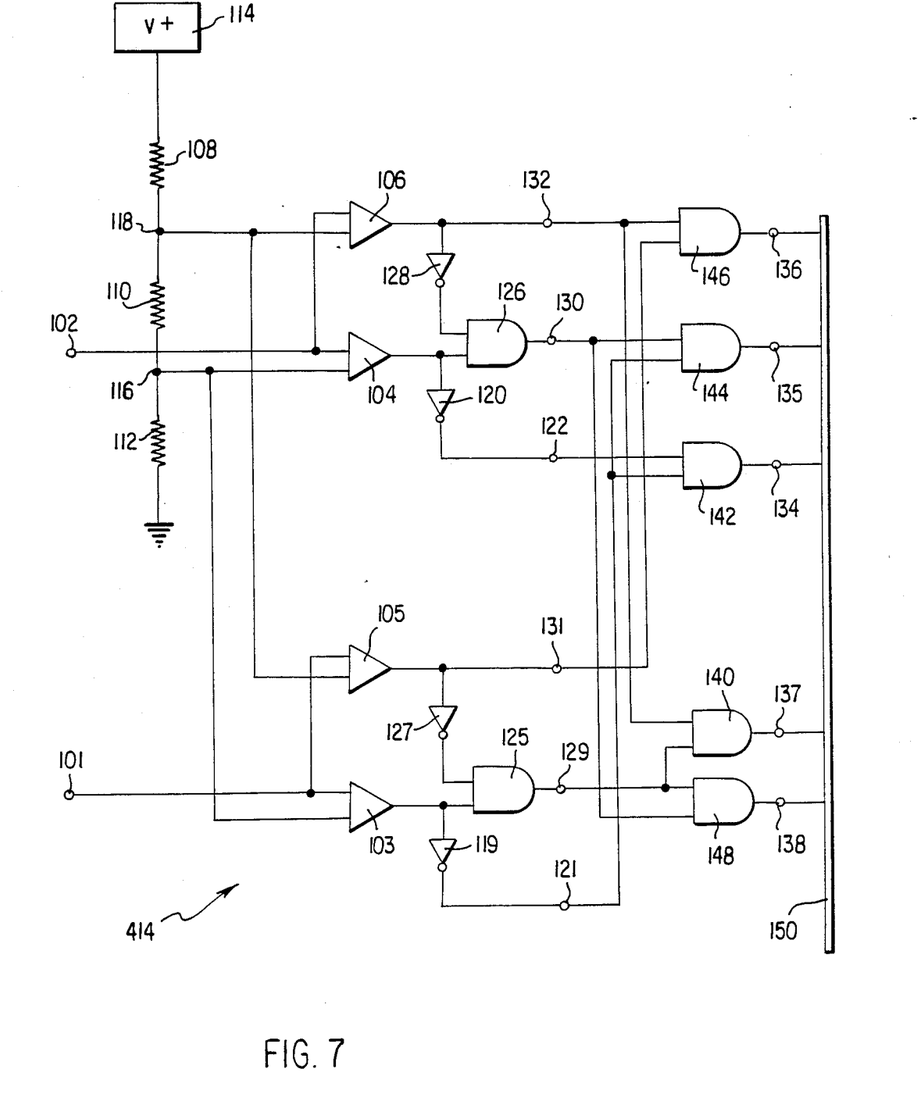
FIG. 7 is a circuit diagram of a first quantizer for determining the magnitude of the amplitude signal component in a 16-QAM system.

A coordinate converter 411, as known, for example, from Analog Devices, Data Sheet and Application Notes AD639, AD637, AD630, Norwood, MA, USA, Volume 6, 1985, transforms the cartesian signal components x and y into the polar signal components R and α. The output signal of coordinate converter 411 which is proportional to amplitude R is fed to two summing devices or adders 412 and 413. Adder 412 forms the difference $R_{min} = R - d_1$ and feeds it to a first (multi-level) decision circuit or quantizer 414. Adder 413 forms the sum $R_{max} = R + d_2$ and likewise feeds it to the first quantizer 414. At its output, quantizer 414 furnishes a digital signal representativ for all those nominal amplitudes from its value supply "R" which lie between the highest decision threshold below or at the lower limit value $R_{min}$ and the lowest decision threshold above or at the upper limit value $R_{max}$. FIG. 7 illustrates an implementation of the first quantizer 414 which is described later on.

Figure 8:
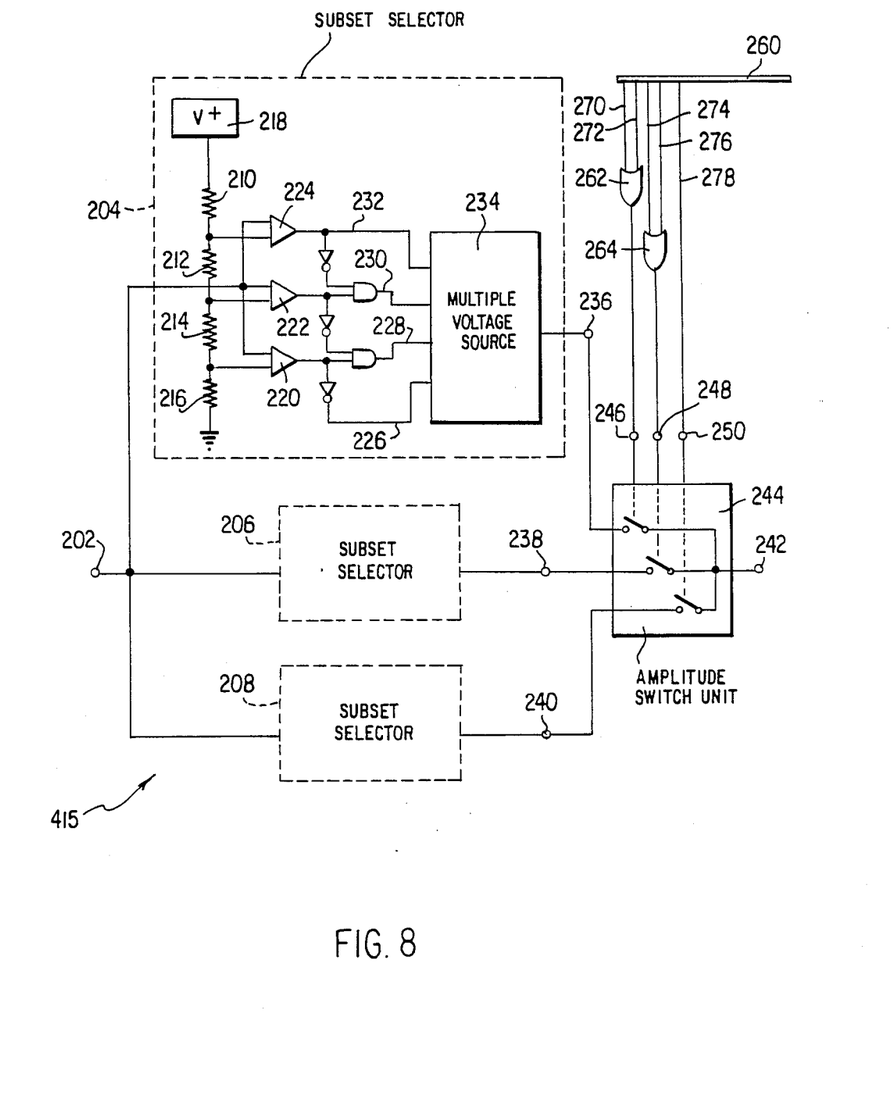
FIG. 8 is a circuit diagram of a second quantizer for determining a phase angle signal component which is consistent with the amplitude value determined by the first quantizer.

The output signal of coordinate converter 411 proportional to phase angle α is fed to a second quantizer 415 which contains the value supply "α" of the phase angles of all permitted signal states. From all phase angles belonging to the nominal amplitudes of value supply "α" put out by the first quantizer 414, the second quantizer 415 decides on that phase angle $\hat{\alpha}$ which lies closest to the phase angle α derived from the received signal state in coordinate converter 411. If two different phase angles should exist in value supply "α" which have the same distance from phase angle α of the received signal, quantizer 415 puts out $\hat{\alpha} = \alpha$ as the decided-upon phase angle. The decided upon phase angle α and the phase angle $\hat{\alpha}$ derived from the received signal state are fed to an adder 416 which furnishes a signal proportional to the phase difference $\psi = \alpha - \hat{\alpha}$ at its output. FIG. 8 illustrates an implementation of the second quantizer 415 which is described later on.

The difference $\psi = \alpha - \hat{\alpha}$ between the angle α of a received signal state and the angle $\hat{\alpha}$ decided upon by means of threshold decision or quantizating for the most probably transmitted signal state provides information about the phase difference ψ between the carrier of the received signal and the carrier of the voltage controlled oscillator. This difference signal, which represents the phase difference, will hereinafter be called the phase detector function $$\epsilon_1(\psi) = \alpha - \hat{\alpha} \tag{18}$$

This function can be used directly for the follow-up control signal $u_{41}$ for the voltage controlled oscillator 10.

As indicated above, FIG. 2 shows a section of a signal state diagram, for example, a 64-QAM system. The dots in the diagram indicate the possible signal states with an ideally regenerated carrier. Each one of these dots lies in a so-called decision region which is delimited, on the one hand, by the thresholds for the amplitude value decision indicated by the circles and, on the other hand, by the thresholds of the phase angle decision (which would be straight lines passing through the zero point of the coordinate system and which are not shown in FIG. 2). For each decision region defined by the circles, there exists a phase detector function $\epsilon_1(\psi)$ according to Equation (18).

The same decision regions as in the phase detector function $\epsilon_1(\psi) = \alpha - \hat{\alpha}$ will also be found for the following modified phase detector functions:

$$\epsilon_2(\psi) := \text{sgn}(\alpha - \hat{\alpha}) \tag{19}$$

$$\epsilon_3(\psi) := w(R_{min}, R_{max}, \alpha) \cdot (\alpha - \hat{\alpha}) \tag{20}$$

$$\epsilon_4(\psi) := w(R_{min}, R_{max}, \alpha) \cdot \text{sgn}(\alpha - \hat{\alpha}) \tag{21}$$

In these equations "sgn" indicates a signum function and means "sign of", such that $\text{sgn}(\alpha - \hat{\alpha}) = 1$ if $\alpha > \hat{\alpha}$, $\text{sgn}(\alpha - \hat{\alpha}) = 0$ if $\alpha = \hat{\alpha}$ and $\text{sgn}(\alpha - \hat{\alpha}) = -1$ if $\hat{\alpha} > \alpha$. Moreover, in these equations the term $w(R_{min}, R_{max}, \alpha)$—hereinafter referred to simply as w—is a non-negative function of the position of the limit values $R_{min}$ and $R_{max}$ and of phase angle α, and is called a weighting function. Using the weighting function w, it is possible to emphasize some phase detector functions over others. The signal state diagram of FIG. 2 shows that there are some amplitude regions in which an erroneous angle decision is less likely than in others. These are the amplitude regions $R_i$ in which there are only a few signal states. If the weighting function w for these amplitude regions is then greater, averaged with respect to the phase angles occurring therein, than for the remaining amplitude regions, a phase detector characteristic $g(\psi)=[\epsilon(\psi)]$ which is an average, with respect to amplitude, over all m phase detector functions (where m is the number of possible signal states) will be influenced more by the phase detector functions emphasized by the weighting function w.

Figure 5:
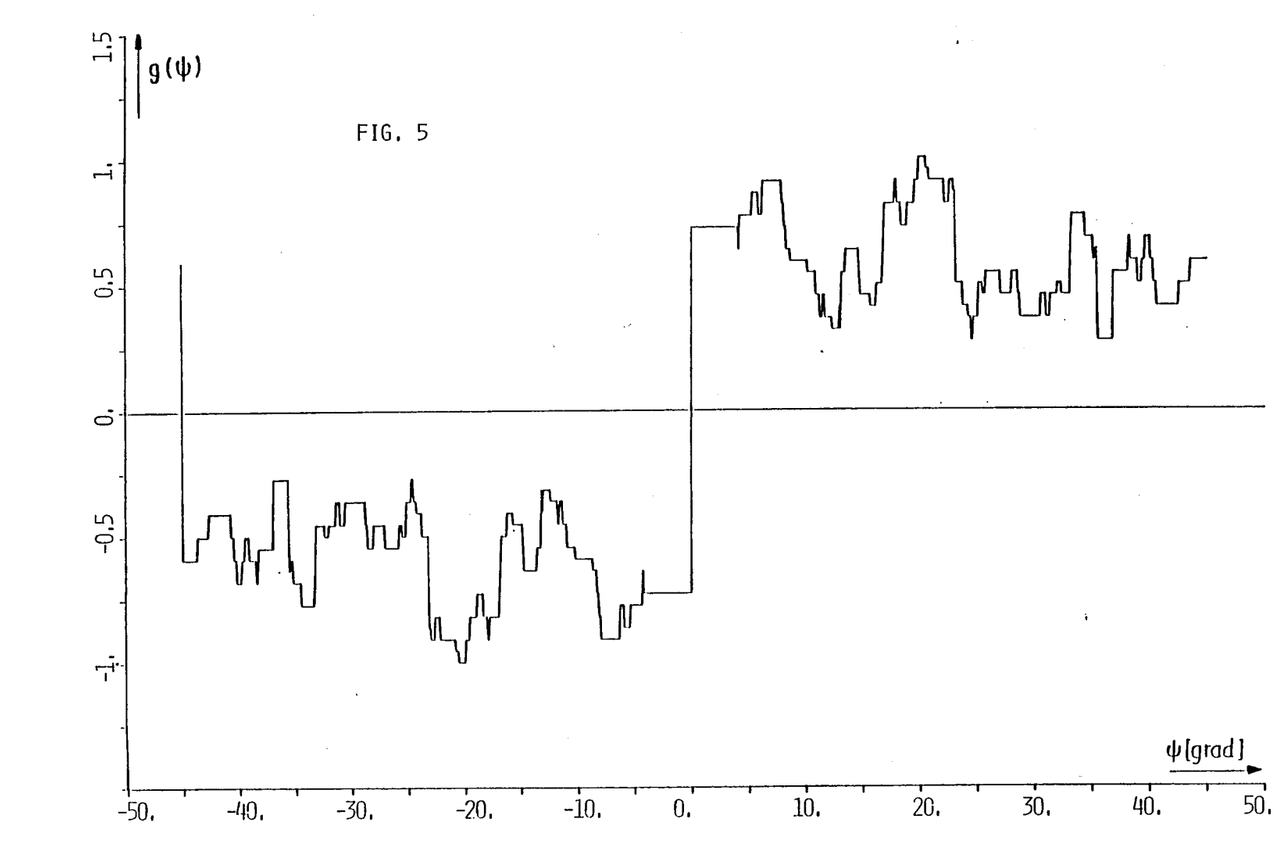
FIG. 5 is a phase detector characteristic of a 64-QAM system operating according to the invention.

Such a phase detector characteristic $g(\psi)=[\epsilon(\psi)]$ is shown in FIG. 5.

Synchronization of the voltage controlled oscillator with the carrier of the received signal is effected for phase differences $\psi=\psi_s$, for which $g(\psi)=0$ and $dg/d\psi>0$ applies. As mentioned above, synchronization should be effected only for the phase difference $\psi=\psi_s=0°$. If $g(\psi_s)=0$ within an interval $(-45°, +45°)$ during which $\psi=\psi_s\neq0°$ also occurs, synchronization errors will occur. However, in the phase detector characteristic, according to the invention shown in FIG. 5, there are no synchronization error points as a result of the method of the invention. Here, $g(\psi)=0°$ in the region of interest, i.e., $-45°<\psi<45°$, exclusively for $\psi=0°$.

If, instead of employing the circuit of FIG. 3 to realize the simplest phase detector function $\epsilon_1(\psi)=\alpha-\hat{\alpha}$, the circuit shown in FIG. 3 is used to realize one of the phase detector functions $\epsilon_2(\psi)$ according to Equation (19) or $\epsilon_4(\psi)$ according to Equation (21), the output of adder 416 is connected to a hard limiter circuit 418, such as a comparator, so as to form the signum function $sgn(\alpha-\hat{\alpha})$. In those cases in which the function $\epsilon_3(\psi)$ according to Equation (20) or the function $\epsilon_1(\psi)$ according to Equation (18) is to be formed, circuit 418 is replaced by a short circuit.

Figure 9:
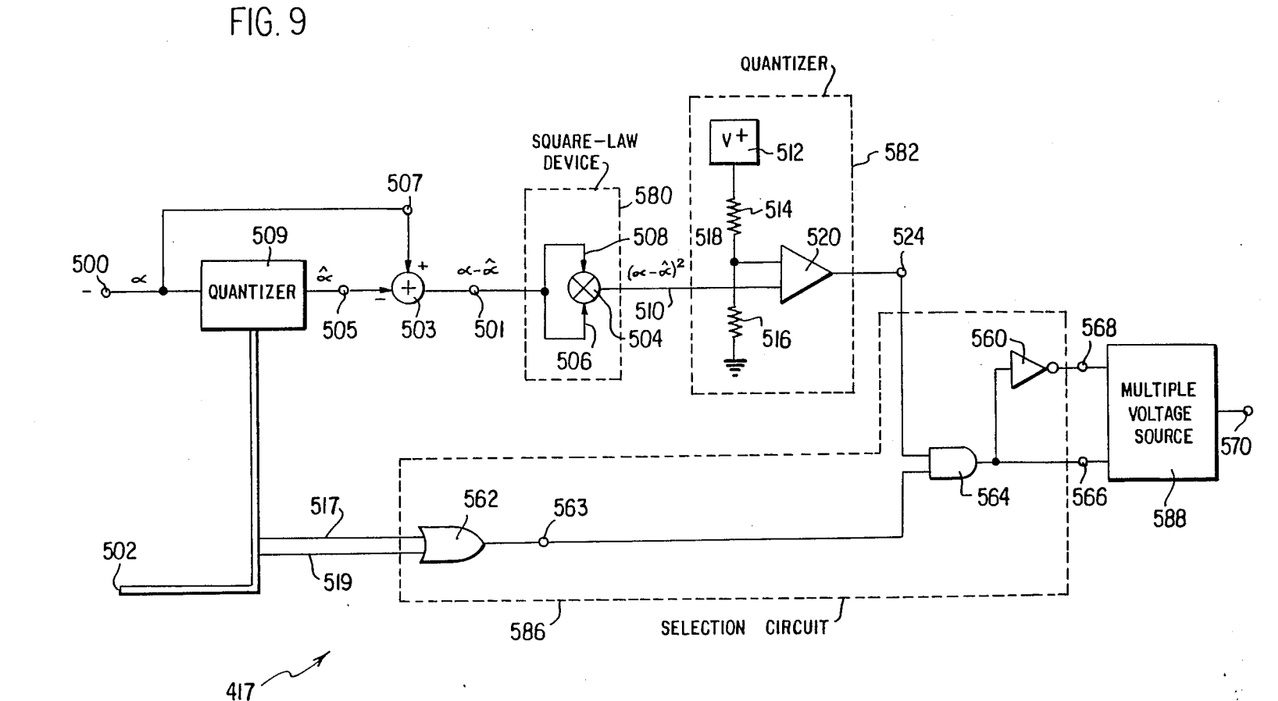
FIG. 9 is a circuit diagram illustrating an example of a weighting function generator according to FIG. 3.

To form function $\epsilon_3(\psi)=w(R_{min}, R_{max}, \alpha)\cdot(\alpha-\hat{\alpha})$ or $\epsilon_4(\psi)=w(R_{min}, R_{max}, \alpha)\cdot sgn(\alpha-\hat{\alpha})$, the output signal of the first quantizer 414 is fed to the first input of a circuit block 417 which generates the weighting function $w(R_{min}, R_{max}, \alpha)$. A second input of circuit block 417 receives the output signal $\alpha$ of coordinate converter 411. FIG. 9 illustrates an implementation of the weighting function circuit 417. The output signal of circuit block 417 and the phase difference signal $\psi=\alpha-\hat{\alpha}$ or $sgn(\alpha-\hat{\alpha})$ are then multiplied in a multiplier 419. At the output of multiplier 419, there is then available a signal which can be used for $u_{41}$ in FIG. 1 and which is proportional to the function $$\epsilon_3(\psi)=w(R_{min}, R_{max}, \alpha)\cdot(\alpha-\hat{\alpha})$$

or to the function $$\epsilon_4(\psi)=w(R_{min}, R_{max}, \alpha)\cdot sgn(\alpha-\hat{\alpha}).$$

In the following, implementations of the quantizers 414 and 415 are described as well as an implementation of the weighting function circuit 417. For the sake of simplicity, these implementations are illustrated for a 16-QAM receive system. In the same manner as illustrated in detail in the example of a 64-QAM-system, the nominal amplitudes, the amplitude thresholds, the phase angle stores and the phase angle thresholds are determined. In 16-QAM systems, the values $a_k$ and $b_k$ are elements of the set $\{-3,-1,1,3\}$. The nominal amplitudes are determined to be $R_1=\sqrt{2}=1.414$, $R_2=\sqrt{10}=3.162$ and $R_3=\sqrt{18}=4.243$. If the decision thresholds are determined as arithmetic means of adjacent nominal amplitudes, then their values are $R_1=2.288$ and $R_2=3.702$. The phase angle stores belonging to the nominal amplitudes are: "$\alpha_1$"="$\alpha_3$"=$\{45°+n\cdot90°\}$ and "$\alpha_2$"=$\{18.4°+n\cdot90°, 71.6+n\cdot90°\}$, whereby n is $-1,0,1,$ or 2. If $d_1=d_2=0.4$ is chosen, then one of the following five situations is found:

1. $R_{min}<\tilde{R}_1$ & $R_{max}<\tilde{R}_1$: $\hat{R}=R_1$ phase angle store: "$\alpha$"="$\alpha_1$".
2. $R_{min}<\tilde{R}_1$ & $\tilde{R}_1\leq R_{max}<\tilde{R}_2$: $\hat{R}=R_1$ or $R_2$ phase angle store: "$\alpha$"="$\alpha_1$"$\cup$"$\alpha_2$".
3. $\tilde{R}_1\leq R_{min}<\tilde{R}_2$ & $\tilde{R}_1\leq R_{max}<\tilde{R}_2$: $\hat{R}=R_2$ phase angle store: "$\alpha$"="$\alpha_2$".
4. $\tilde{R}_1\leq R_{min}<\tilde{R}_2$ & $\tilde{R}_2\leq R_{max}$: $\hat{R}=R_2$ or $R_3$ phase angle store: "$\alpha$"="$\alpha_2$"$\cup$"$\alpha_3$"="$\alpha_1$"$\cup$"$\alpha_2$".
5. $\tilde{R}_2\leq R_{min}$ & $\tilde{R}_2\leq R_{max}$: $\hat{R}=R_3$. phase angle store: "$\alpha$"="$\alpha_3$"="$\alpha_1$".

Taking arithmetic means of adjacent angles, the phase angle thresholds are elements of the set:

- "$\tilde{\alpha}_1$" = $\{0°, 90°, 180°, 270°\}$, if "$\alpha$" = "$\alpha_1$"
- "$\tilde{\alpha}_2$" = $\{-45°, 0°, 45°, 90°, 135°, 180°, 225°, 270°\}$, if "$\alpha$" = "$\alpha_2$"
- "$\tilde{\alpha}_3$" = $\{-58.3°, -31.7°, 0°, 31.7°, 58.3°, 90°, 121.7°, 148.3°, 180°, 211.7°, 238.3°, 270°\}$, if "$\alpha$" = "$\alpha_1$"$\cup$"$\alpha_2$".

FIG. 7 illustrates an implementation of the first quantizer 414 with two input terminals 101 and 102 and an output bus line 150. An analog input signal which is representative for $R_{min}=R-d_1$, is applied, via input terminal 101, to comparators 103 and 105. At the same time, an analog signal which is representative for $R_{max}=R+d_2$, is applied, via input terminal 102, to comparators 104 and 106. Resistors 108, 110, and 112 are series-connected between voltage source 114 and ground. The resistance values ares selected so that the potential at intermediate connection point 116 is $\tilde{R}_1$ and the potential at intermediate connection point 118 is $\tilde{R}_2$. Accordingly, it will be apparent that comparator 104 turns ON (logically high, H) if $R_{max}$ exceeds $\tilde{R}_1$, and that comparator 106 also turns ON if it exceeds $\tilde{R}_2$. On the other hand if the magnitude of the signal applied to terminal 102 does not exceed the lower decision threshold $\tilde{R}_1$, comparator 104 remains OFF (logically low, L) and consequently inverter 120 turns ON thereby providing a signal via terminal 122 to one input of AND-gate 142. Additionally, the output of comparator 104 is provided to one input of AND-gate 126, the other input of which is connected by inverter 128 to the output of comparator 106. Gate 126 turns ON, and thus provides a signal via terminal 130 to one input of AND-gate 144, when the magnitude of the signal applied to terminal 102 is greater than $\tilde{R}_1$ but less than $\tilde{R}_2$. Finally, when the magnitude of the signal at terminal 102 exceeds $\tilde{R}_2$, comparator 106 turns ON to provide an input signal via terminal 132 to one input of AND-gate 146. Thus, the voltage at terminal 132 is ON, exactly when $R_{max}$ is decided to be $R_3$, the voltage at terminal 130 is ON, exactly when $R_{max}$ is decided to be $R_2$ and the voltage at terminal 132 is ON, exactly when $R_{max}$ is decided to be $R_1$.

Since the circuitry consisting of comparators 103 and 105, inverters 119 and 127 and AND-gate 125 works exactly as the circuitry consisting of comparators 104 and 106, inverters 120 and 128 and AND-gate 126, and since $R_{min}$ is applied, via terminal 101, to the second inputs of comparators 103 and 105, the voltage at terminal 131 is ON, exactly when $R_{min}$ is decided to be $R_3$, the voltage at terminal 129 is ON, exactly when $R_{min}$ is decided to be $R_2$, and the voltage at terminal 121 is ON, exactly when $R_{min}$ is decided to be $R_1$. Terminal 131 is connected to the second input of AND-gate 146, terminal 129 is connected to the second input of AND-gate 140 and to the second input of AND-gate 148, and terminal 121 is connected to the second input of AND-gate 144 and to the second input of AND-gate 142.

Thus the output 136 of gate 146 turns ON, exactly when both $R_{min}$ and $R_{max}$ are decided to be $R_3$ which means that the received signal amplitude R is decided to be $R_3$. The output 137 of gate 140 turns ON, exactly when $R_{max}$ is decided to be $R_3$ and $R_{min}$ is decided to be $R_2$ which means that the amplitude R of the received signal is either $R_2$ or $R_3$. The output 138 of gate 148 turns ON, exactly when $R_{max}$ is decided to be $R_2$ and $R_{min}$ is decided to be $R_2$ which means that the amplitude R of the received signal is decided to be $R_2$. The output 135 of gate 144 turns ON, exactly when $R_{max}$ is decided to be $R_2$ and $R_{min}$ is decided to be $R_1$ which means that the received signal amplitude R is either $R_1$ or $R_2$. The output 134 of gate 142 turns ON, exactly when $R_{max}$ is decided to be $R_1$ and $R_{min}$ is decided to be $R_1$ which means that the received signal amplitude R is decided to be $R_1$.

Terminals 134 to 138 are connected to a bus line 150 which is the output line of quantizer 414.

FIG. 8 illustrates an implementation of a second quantizer 415 for matching a received phase angle component α with an appropriate phase angle selected from the set of all phase angles for true signals in the 16-QAM signalling system of the example. As will be seen, the selection is made from among a subset which includes only phase angles appropriate for the already determined decided values $R_{min}$ and $R_{max}$, so that the phase angle that is selected depends on $R_{min}$, $R_{max}$ and the decision thresholds given by the value store "α" which is selected by $R_{min}$ and $R_{max}$.

The second quantizer 415 includes a bus line 260 as an input line. Bus line 260 includes a simple line 270 the voltage on which is ON if and only if $R_{min} < \tilde{R}_1$ & $R_{max} < \tilde{R}_1$, it includes a simple line 272 the voltage on which is ON if and only if $\tilde{R}_2 < R_{min}$ & $\tilde{R}_2 \leq R_{max}$, it includes a simple line 274 the voltage on which is ON if and only if $R_{min} < \tilde{R}_1$ & $\tilde{R}_1 \leq R_{max} < \tilde{R}_2$, it includes a simple line 276 the voltage on which is ON if and only if $\tilde{R}_1 \leq R_{min} < \tilde{R}_2$ & $\tilde{R}_2 \leq R_{max}$, and it includes a simple line 278 the voltage on which is ON if and only if $\tilde{R}_1 \leq R_{min} < \tilde{R}_2$ & $\tilde{R}_1 \leq R_{max} < \tilde{R}_2$. It will be recalled that a bus line with these signals is the output line of the first quantizer 414 of FIG. 7. For this purpose bus line 150 of FIG. 7 is connected to bus line 260 of FIG. 8.

Lines 270 and 272 are connected to the inputs of OR-gate 262 the output of which is connected, via terminal 246, to an amplitude switch unit 244. The voltage at terminal 246 is thus ON exactly when "α"="α₁".

Lines 274 and 276 are connected to the inputs of OR-gate 264 the output of which is connected, via terminal 248, to amplitude switch unit 244. The voltage at terminal 248 is thus ON exactly when "α"="α₁"∪"α₂".

Line 278 is connected, via terminal 250, to amplitude switch unit 244. The voltage at terminal 246 is thus ON exactly when "α"="α₂".

The second quantizer 415 further includes a terminal 202 for receiving an input signal corresponding to the phase angle component α of a received signal, the input signal being distributed to a subset selector 204 for use when "α"="α₁", to another subset selector 206 for use when "α"="α₁"∪"α₂", and to a further subset selector 208 for use when "α"="α₂".

In selector 204, resistors 210, 212, 214, and 216 are series connexted between a voltage source 218 and ground to provide intermediate connection points which in turn provide threshold values $\tilde{\alpha}_{1,1}$, $\tilde{\alpha}_{1,2}$, and $\tilde{\alpha}_{1,3}$ respectfully to comparators 220, 222, and 224. Each of these comparators 220, 222, and 224 also receives the input signal applied to terminal 202, and compares the magnitude of this input signal to the threshold voltage at the respective intermediate connection point. These threshold voltages ares selected so that each corresponds to an appropriate decision threshold stored in "$\tilde{\alpha}_1$". As described above, "$\tilde{\alpha}_1$"={0°, 90°, 180°, 270°}. To distinguish between a −45° phase angle and a +45° phase angle, the voltage at the intermediate connection point sensed by comparator 220 corresponds to a decision threshold $\tilde{\alpha}$ at 0°. Similarly, comparator 222 receives a voltage corresponding to a decision threshold $\tilde{\alpha}$ at 90°, and comparator 224 receives a voltage corresponding to a decision threshold $\tilde{\alpha}$ at 180°. Accordingly, the signal on conductor 226 becomes logically high when the input voltage at terminal 202 corresponds to a received phase angle α of less than 0°; the signal on conductor 228 becomes logically high when the input signal at terminal 202 corresponds to a received phase angle α of between 0° and 90°; the signal on conductor 230 becomes logically high when the input signal at terminal 202 corresponds to a phase angle α of between 90° and 180°; and the signal on conductor 232 becomes logically high when the input signal at terminal 202 corresponds to a phase angle α greater than 180°. If it is conductor 226 that is logically high, multiple voltage source 234 generates a voltage corresponding to precisely −45° at output terminal 236. Similarly, if it is conductor 228 that is logically high, source 234 generates a voltage corresponding to 45°; if it is conductor 230 that is logically high, the voltage at terminal 236 corresponds to 135°; and when conductor 232 is logically high, source 234 generates an output voltage corresponding to 225°. It should be noted that the output signals available at terminal 236 correspond to the store "α₁".

Although not illustrated in detail, subset selector 206 is similar to selector 204 in construction except that it is able to generate the voltages, at its output terminal 238, which correspond to the phase angles stores in "α₁"∪"α₂", and selector 208 generates signals at its output terminal 240 which correspond to the phase angles stored in "α₂". Together, the terminals 236, 238 and 240 can provide voltages corresponding to phase angles for all five combinations of $R_{min}$ and $R_{max}$.

The output terminal 242 of second quantizer 415 is connected to one of the terminals 236, 238, or 240 by amplitude switch unit 244. Which of terminals 236, 238, and 240 is selected depends upon the signals at terminals 246, 248, and 250. It will be recalled that terminal 246 is logically high when phase angles of the store "α₁" are to be chosen. Similarly, when terminal 248 is logically high, then phase angles of the store "α₁"∪"α₂" are to be chosen, and when terminal 250 is logically high, then phase angles of the store "$\alpha_2$" are to be chosen. Thus, the output at terminal 242 will be deemed the decided phase angle $\bar{\alpha}$.

FIG. 9 is a circuit diagram illustrating an example of a weighting function generator 417 according to FIG. 3 and with one input terminal 500, one input bus line 502 and one output terminal 570. It consists of a first quantizer 509, a summing device 503, a square-law device 580, a second quantizer 582, a selection logic circuit 586 and a multiple voltage source 588. The circuit is an implementation for the 16-QAM signalling system. As will be seen, a signal is generated at output 570 which is at a high positive voltage if R is equal to $R_1$ or $R_3$ and the absolute value of $\alpha - \alpha$ is greater than 10°; a lower positive voltag is generated in all other cases.

On terminal 500, an input signal corresponding to the phase angle component $\alpha$ of a received signal is applied, the input signal being distributed to the input of quantizer 509 and a first input of summing device 507. Input bus line 502 includes a simple line 517 the voltage on which is ON if and only if $R_{min} < \bar{R}_1$ & $R_{max} < \bar{R}_1$, it includes a simple line 519 the voltage on which is ON if and only if $\bar{R}_2 \leq R_{min}$ & $\bar{R}_2 \leq R_{max}$, it includes three further lines the voltage on the first line is ON if and only if $R_{min} < \bar{R}_1$ & $\bar{R}_1 \leq R_{max} < \bar{R}_2$, the voltage on the second line is ON if and only if $\bar{R}_1 \leq R_{min} < \bar{R}_2$ & $\bar{R}_2 \leq R_{max}$, and the third line the voltage on which is ON if and only if $\bar{R}_1 \leq R_{min} < \bar{R}_2$ & $\bar{R}_1 \leq R_{max} < \bar{R}_2$. It will be recalled that a bus line with these signals is the output line of the first quantizer 414 of FIG. 7. For this purpose bus line 150 of FIG. 7 is connected to bus line 502 of FIG. 9.

Quantizer 509 produces at its output terminal 505 a voltage corresponding to the decided phase angle $\hat{\alpha}$. An implementation of such a quantizer is illustrated in FIG. 7.

Lines 517 and 519 of the bus line are connected to an OR-gate 562. Therefore, the output of OR-gate 562 turns ON (logically high) when either $R_{max}$ is lower than $R_1$ or when $R_{min}$ is greater than $R_3$ which means that the output of OR-gate 562 turns on if $\hat{R}$ is $R_1$ or $R_3$. OR-gate 562 and its output terminal 563 are parts of a selection circuit 586.

Apparently, instead of using output terminal 505 of quantizer 509, and instead of using output terminal 563 of OR-gate 562, it would be possible to use terminals 242 and 246 of the circuit according to FIG. 8. In this case, quantizer 509 and OR-gate 562 may be omitted.

Terminal 505 is connected to the second input of summing device 503 the output of which produces a signal which is the difference between the first input signal and the second input signal of this device. Since the signal at terminal 505 is representative for $\hat{\alpha}$, and since the signal at terminal 507 is represenative for $\alpha$, the voltage at output terminal 501 of the summing device is representating $\alpha - \hat{\alpha}$. This voltage is fed into the input of square-law device 580 which consists of a multiplier 504 with its two input lines 508 and 506 being connected to terminal 501. Thus a voltage representing $(\alpha - \hat{\alpha})^2$ is present at output 510 of multiplier 504. This voltage is fed to the input of the second quantizeer 582. This input is connected to one input of a comparator 520. Resistors 514 and 516 are series-connected between voltage source 512 and ground. The resistance values are selected so that the potential at the intermediate connection point 518 is equal to the voltage which would be generated at the output of multiplier 504 when $\alpha - \hat{\alpha}$ is 10°. Thus the comparator turns ON, if the signal at terminal 501 corresponds to an angle difference with absolute value greater than 10°. Otherwise it turns OFF. The output signal of comparator 520 is available at terminal 524 which is the output terminal of the second quantizer 582.

In the selection-circuit 586, the output signals of quantizer 582 and the output signal of OR-gate 562 are connected to the inputs of an AND-gate 564. Since the output signal of OR-gate 562 turns ON exactly if $\hat{R}$ is either $R_1 R_3$, and since the output signal of comparator 520 is ON if and only if the absolute value of $\alpha - \hat{\alpha}$ is greater than 10°, AND-gate 564 turns ON if and only if $\hat{R}$ is either $R_1$ or $R_3$ and if the absolute value of $\alpha - \alpha$ is greater than 10°. The output signal of gate 564 is connected to terminal 566 and to an inverter 560 whose output signal at terminal 568 is thus ON if $\hat{R}$ equals $R_2$ or if the absolute value of $\alpha - \hat{\alpha}$ is less than 10°. Otherwise it is OFF.

The signals at terminals 568 and 566 are used to contorl a multiple-voltage source 588. At its output terminal 570, a positive voltage, e.g. 1 V, is genterted if the signal at terminal 568 is ON and if the signal at terminal 566 is OFF. In the opposite case, a higher positive voltage, e.g. 4 V, is generated at output terminal 570. Thus, at output terminal 570 a signal is generated which is a function of $\alpha$ as well as of $R_{min}$ and of $R_{max}$.

A modification of the above described method will now be described. In this case, the cartesian signal components x and y are approximated by quantized signal components x and y. From the quantized cartesian signal components x and y there then results the quantized polar signal component;

$$\hat{\hat{\alpha}} := \begin{cases} \arctan(\hat{y}/\hat{x}), & \text{if } \hat{\hat{x}} \geq 0 \\ \arctan(\hat{y}/\hat{x}) + \pi, & \text{if } \hat{\hat{x}} < 0 \end{cases} \tag{22}$$

In this way, one obtains approximations of the phase detector functions $\epsilon_2(\psi)$ and $\epsilon_4(\psi)$, respectively, as follows:

$$\epsilon_5(\psi) := \text{sgn}\,(\hat{\hat{\alpha}} - \hat{\alpha}) \tag{23}$$

and, respectively, $$\epsilon_6(\psi) := w(R_{min}, R_{max}, \hat{\hat{\alpha}}) \cdot \text{sgn}\,(\hat{\hat{\alpha}} - \hat{\alpha}) \tag{24}$$

In principle, $\hat{\alpha}$ and $\hat{R}$ are determined from $\hat{\hat{x}}$, $\hat{\hat{y}}$ precisely as described above, except that it is now the signal pair $(\hat{\hat{x}}, \hat{\hat{y}})$ which is available for the R and $\alpha$ decision, instead of (x, y).

Only a certain number of pairs $(\hat{\hat{x}}, \hat{\hat{y}})$ exist, with this number being a function of the quantizing stages for x and y. Quantizing or decision making is therefore no longer necessary to form $\hat{R}$ and $\hat{\alpha}$. Rather, only a predeterminable translaton table is required which associates a certain output signal pair $(\hat{R}, \hat{\alpha})$ with each signal pair $(\hat{\hat{x}}, \hat{\hat{y}})$. From these values it is easy to form a decision diagram.

A decision diagram may be explained as follows. Corresponding to equations (7) and (8), the components x and y of the received signal are orthogonal to each other and may thus be interpreted as points of a plane. This plane is now subdivided into regions, called decision regions, each point of which leads to the same quantized pair $(\hat{\hat{x}}, \hat{y})$. For example, if quantization is such that numbers between 2.5 and 3.5 are quantized to 3, then all points (x,y) of a square with $2.5<x<3.5$ and $2.5<y<3.5$ will be quantized to $(\hat{x},\hat{y})=(3,3)$. This square is thus one decision region (of many regions) of the (x,y)-plane. Since for each decision region the output value of a given phase detector function is predeterminable, this value may be written into the decision region, thus producing a "decision diagram".

Decision diagrams may easily be stored in a logic select circuit, since to each value pair $(\hat{x},\hat{y})$ a digital number may be associated which may be interpreted as an input signal of a digital circuit the output of which is the digital signal representing the number stored in the decision region which is represented by the input number.

Figure 4:
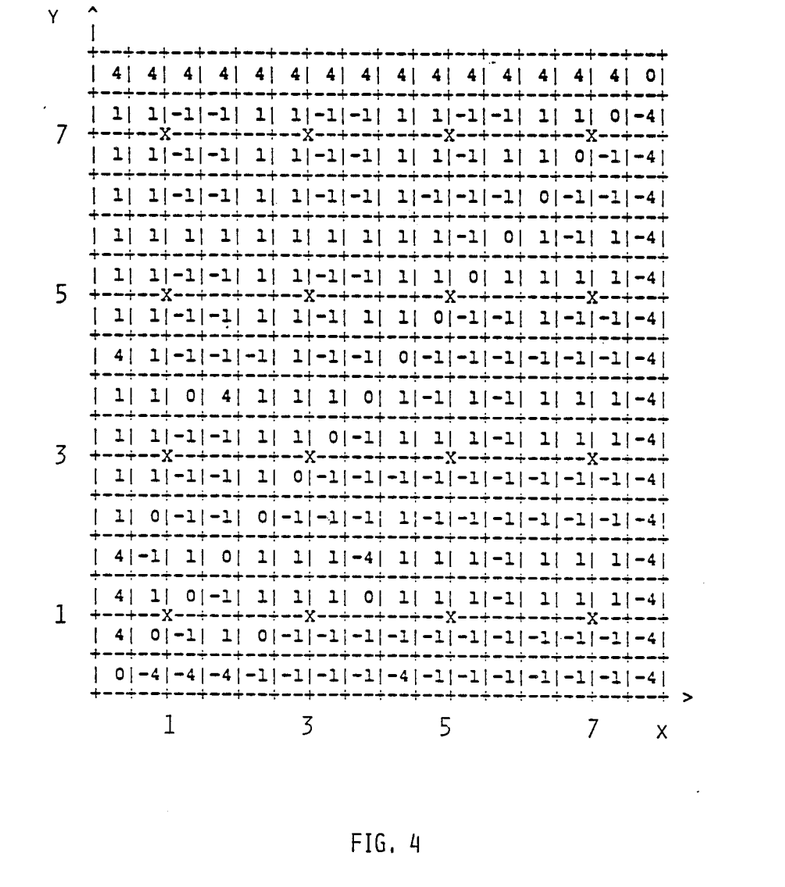
FIG. 4 is a decision diagram of a 64-QAM system operating according to the invention.

A decision diagram for a 64-QAM signal derived from the phase detector function $\epsilon_6(\psi)=w(R_{min}, R_{max}, \hat{\alpha})\cdot\text{sgn}(\hat{\alpha}-\alpha)$ is shown in FIG. 4, but only in its first quadrant, because the second, third and fourth quadrants show decision regions which evolve from the decision region of the first quadrant by rotation about 90°, 180° and 270°, respectively.

FIG. 5 shows the average phase detector characteristic $g(\psi)=[\epsilon_6(\psi)]$ applicable for this example, if it is assumed that all signal states occur with the same frequency.

The individual phase detector functions $\epsilon_5(\psi)$ and $\epsilon_6(\psi)$, hereinafter abbreviatedly called $\epsilon(\psi)$, can be determined according to a particularly simple method.

Figure 6:
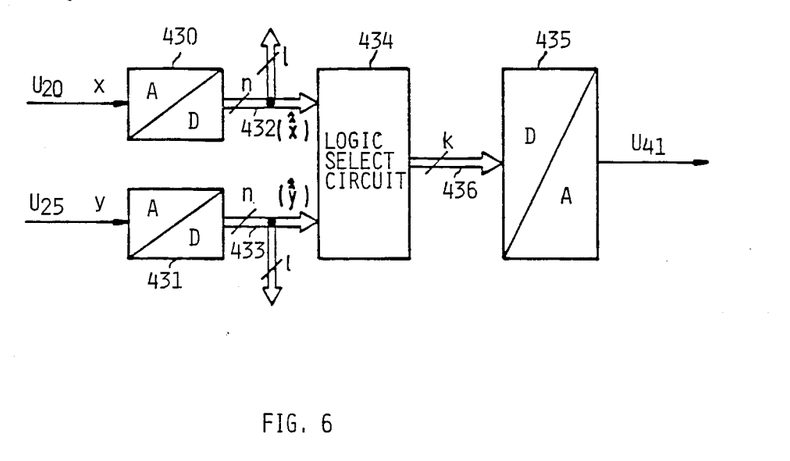
FIG. 6 is a block circuit diagram for determining a phase difference signal with quantized signal components according to a modification of the invention.

A block circuit diagram of a modified baseband processor portion for implementing the method is shown in FIG. 6. The cartesian coordinate signal components x and y are quantized and coded by means of two analog/digital converters 430 and 431 so that n-bit words $\hat{x}$ and $\hat{y}$ are present at the outputs 432 and 433 of the respective analog/digital converters 430 and 431. The two n-bit outputs 432 and 433, of the respective analog/digital converters are connected to a logic selection circuit 434. This circuit forms the association of the various function values $\epsilon(\psi)$ with the input data (x, y) and furnishes the function values in k-bit coded form on a k-bit line 436. A digital/analog converter 435 forms the signal proportional to $\epsilon(\psi)$ from the k-bit representation.

The particular advantage of this realization is that, after synchronization, l of the n bits on respective lines 432 and 433, already represent the l-bit coded form of the demodulated signals x and y, respectively. One possible form of realizing the logic selection circuit 434 is a memory (e.g. a RAM, ROM, PROM) which forms k different function bits from the 2n-bit address formed of $\hat{x}$ and $\hat{y}$ with these function bits, in their entirety, corresponding to the function value of $\epsilon(\psi)$ belonging to each address.

A further advantage of the circuit according to FIG. 6 in combination with the embodiment of selector circuit 434 as a memory is that the phase detector characteristic, which is determined by the memory contents, can easily be changed by exchanging the memory or its contents.

The present disclosure relates to the subject matter disclosed in European patent application No. EP 87 103 453.4, filed Mar. 10, 1987, the entire specification of which is incorporated herein by reference.

It will be understood that the above description of the present invention is susceptible to various modifications, changes and adaptations, and the same are intended to be comprehended within the meaning and range of equivalents of the appended claims.

I claim:

1. A method of obtaining a signal representing the phase angle difference between a local oscillator signal and the carrier of an amplitude and/or phase shift keyed received signal having a plurality of possible signal states, said method comprising the steps of:
   (a) dividing the received signal into a pair of cartesian coordinate signal components which are a function of the phase angle difference and which are in quadrature relationship to one another, with the two signal components together representing one of the possible signal states;
   (b) converting the pair of cartesian coordinate signal components into a corresponding pair of polar coordinate signal components, with a first of said pair of polar signal components representing the amplitude (R) of a signal state vector formed by the pair of cartesian coordinate signal components, and with the second of said pair of polar signal components representing the phase angle ($\alpha$) for this signal state vector;
   (c) forming an upper limit value ($R_{max}$) by adding a value ($d_2$) to said first polar signal component representing the amplitude (R), and forming a lower limit value ($R_{min}$) by subtracting a value ($d_1$) from said first polar signal component representing the amplitude (R);
   (d) providing a first quantizer which contains a set or supply of predetermined amplitude values derived from all possible, true signal states, with said predetermined amplitude values being staggered such that a predetermined value of said set is disposed below and above each possibly occurring amplitude value;
   (e) feeding said upper limit value ($R_{max}$) and the lower limit value ($R_{min}$) to the first quantizer and utilizing the first quantizer to determine all those amplitude values from said set of predetermined amplitude values which lie between the highest predetermined amplitude value below or at said lower limit value ($R_{min}$), and the lowest predetermined amplitude value above or at said upper limit value ($R_{max}$);
   (f) providing a second quantizer which contains a set or supply of predetermined phase angle values derived from all possible, true signals states;
   (g) feeding said second polar signal component corresponding to the phase angle ($\alpha$) of the received signal to the second quantizer and utilizing the second quantizer to determine which phase angle value, selected from said set of predetermined phase angle values and belonging to all signal state vectors having the amplitude values determined in step (e), comes closest to the phase angle represented by said second polar signal component derived from the input signal; and
   (h) determining the difference between the phase angle value determined in step (g) and the phase angle represented by said second polar signal component derived from the input signal, with said difference being proportional to the phase angle difference between the local oscillator signal and the carrier of the keyed received signal.

2. A method as defined in claim 1, further comprising the step of using a limiter circuit to form a signum function from the phase angle difference determined in step (h).

3. A method as defined in claim 2, further comprising multiplying the signum function by a weighting function (w) having a value which is inversely related to the number of signal states having the same polar coordinate amplitude as the signal state for which the phase angle difference was determined in step (h).

4. A method as defined in claim 2, further comprising multiplying the signum function by a weighting function (w) which takes only non-negative values and which has a value which is inversely related to the number of signal states having the same polar coordinate amplitude as the signal state for which the phase angle difference was determined in step (h).

5. A method as defined in claim 4 further comprising using a signal corresponding to the product of the signum function and the weighting function to control a voltage controlled oscillator in a demodulator circuit of a quadrature receiver for the received signal, the voltage controlled oscillator generating the local oscillator signal.

6. A method as defined in claim 1, further comprising multiplying the phase angle difference signal determined in step (h) by a weighting function (w) which has a value inversely related to the number of signal states having the same polar coordinate amplitude component as the signal state for which the phase angle difference was determined in step (h).

7. A method as defined in claim 1, further comprising using a signal representing the phase angle difference determined in step (h) as a control signal for a voltage controlled oscillator in a demodulator circuit with carrier recovery for amplitude and/or phase shift keyed received signals, wherein the voltage controlled oscillator generates the local oscillator signal.

8. A method as defined in claim 1, further comprising quantizing each of said cartesian coordinate signal components, and then converting each pair of cartesian coordinate quantized signal components into said pair of polar coordinate signal components.

9. A method for recovering a signal representing the phase angle difference between a local oscillator signal and the carrier of a received signal that was generated by amplitude and/or phase shift keying, the received signal having a plurality of possible signal states, said method comprising the steps of:
(a) dividing the received signal into a pair of cartesian coordinate signal components which are dependent on the phase angle difference and which are in quadrature relationship with one another, each of the components having a plurality of possible values and the pair of components together representing one of the possible signal states;
(b) quantizing the pair of cartesian coordinate signal components, with the number of quantizing steps for each component being greater than the number of possible values for that component;
(c) applying the pair of quantized signal components as an address signal to a memory which stores a plurality of predetermined values corresponding to a function of possible phase angle differences, and which provides a predetermined one of the stored values in response to a corresponding pair of quantized signal components, with the respective predetermined ones of the stored values being formed by
converting a pair of cartesian coordinate signal components into a corresponding pair of polar oriented signal components, with a first one of the pair of polar oriented signal components representing the amplitude of a signal state vector formed by the pair of cartesian quantized signal components and with a second one of the pair of polar coordinate signal components representing the phase angle for this signal state vector,
forming an upper limit value ($R_{max}$) by adding a value ($d_2$) to the first polar signal component representing the amplitude (R), and forming a lower limit value ($R_{min}$) by subtracting a value ($d_1$) from the first polar signal component representing the amplitude (R),
determining all those amplitude values, selected from a supply of predetermined amplitude values derived from all possible, true signal states, which lie between the highest predetermined amplitude value below or at the lower limit value ($R_{min}$), and the lowest predetermined amplitude value above or at the upper limit value ($R_{max}$),
determining which phase angle value, selected from a supply of predetermined phase angle values, derived from all possible, true signal states and belonging to all signal state vectors having the amplitude values determined with regard to said lower and upper limit values, comes closest to the phase angle represented by said second polar signal component derived from the input signal, and
forming the difference between the determined phase angle value and the phase angle represented by the second polar signal component of the input signal, the stored value being a function of this difference.

10. A method as defined in claim 9, wherein step (b) is conducted using analog-to-digital converters which quantize the pair of cartesian coordinate signal components in parallel to provide a digital word, and wherein step (c) is conducted by applying the digital word to the memory as an address signal for reading out a corresponding stored value.

11. A method as defined in claim 10, further comprising the step of usng a signal representing the value read out of the memory to control a voltage controlled oscillator in a demodulator circuit for the received signal, with the voltage controlled oscillator generating the local oscillator signal.

* * * * *